Aug. 21, 1945.  T. ULRICH  2,383,029
VEHICLE BODY
Filed Oct. 16, 1939  4 Sheets-Sheet 1
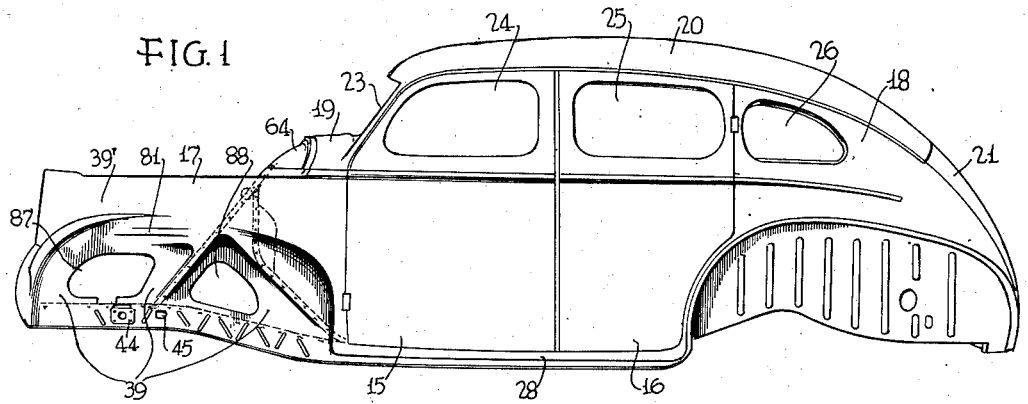
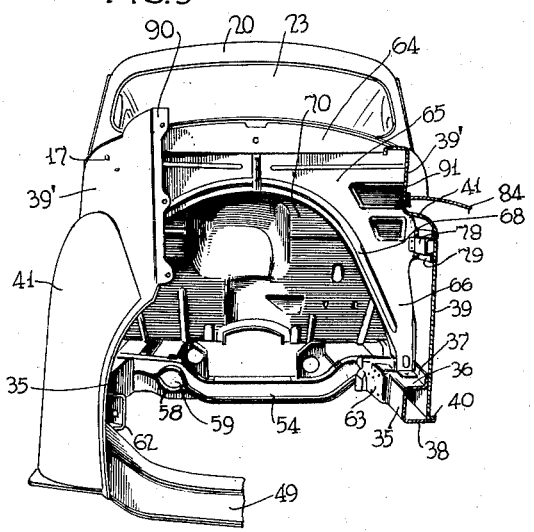
INVENTOR:
Theodore Ulrich.
BY John P. Tarbox
ATTORNEYS.

Aug. 21, 1945.  T. ULRICH  2,383,029
VEHICLE BODY
Filed Oct. 16, 1939  4 Sheets-Sheet 2

INVENTOR
Theodore Ulrich.
BY John P. Tarbox
ATTORNEY

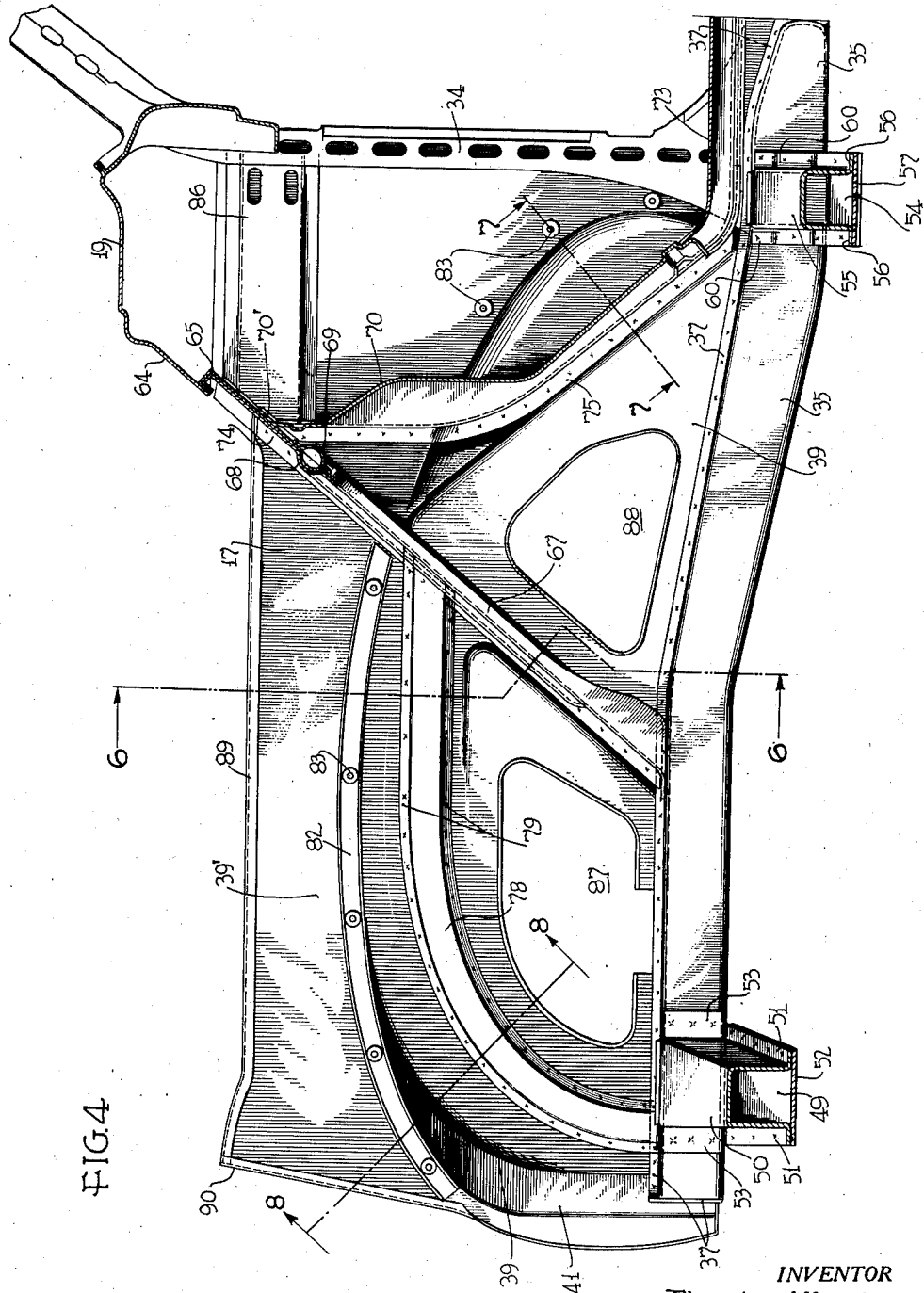

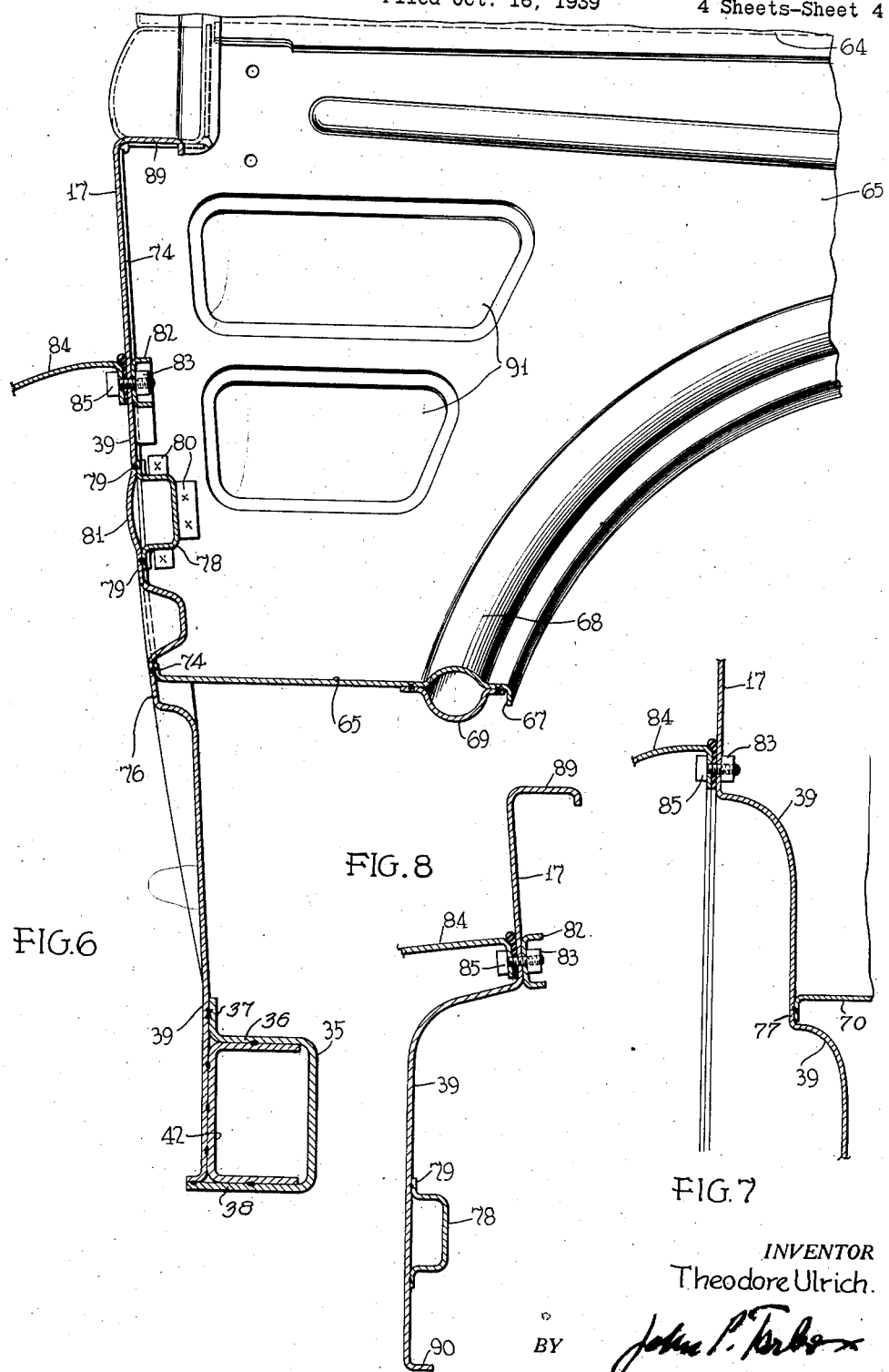

Patented Aug. 21, 1945

2,383,029

UNITED STATES PATENT OFFICE 2,383,029

VEHICLE BODY

Theodore Ulrich, Detroit, Mich., assignor to Edward G. Budd Manufacturing Company, Philadelphia, Pa., a corporation of Pennsylvania Application October 16, 1939, Serial No. 299,595

2 Claims. (Cl. 296—28)

The invention relates to a vehicle body and more particularly to an automobile body. The invention is preferably applicable to a type of automobile bodies which combines the functions of the body and the previously usual chassis thereby dispensing with a separate chassis.

It is an object of the invention to improve the structure of vehicle bodies in regard to the strength, the ease of manufacture and the assemblage of the different parts.

It is particularly among the objects of the invention to improve the end wall construction which is disclosed in my earlier application Serial No. 191,396 filed on February 19, 1938, under the title "End wall construction for vehicle bodies," now Patent No. 2,289,395, issued July 14, 1942.

Certain features disclosed but not claimed in this application form the subject matter of the inventor's application Serial Number 476,610, for "Sill structure, especially for automobiles," filed February 20, 1943, as a division of the present application.

The features of the invention and further objects and advantages thereof will become apparent from the embodiment which is shown in the attached drawings and from the following description of such embodiment.

In the drawings:

Fig. 1 is a side elevation of an automobile body built in accordance with the invention;

Fig. 4 is a vertical section of the front end of the body at a still larger scale along the longitudinal vertical middle plane of the body;

Fig. 5 is a perspective front elevation of the body with certain parts being broken away and at about the scale of Fig. 1;

Fig. 6 is a section through the one side wall and the adjacent parts of the body along line 6—6 yet at a larger scale than Fig. 4;

Fig. 7 is a fragmentary section through a portion of the side wall along the line 7—7 of Fig. 4 at about the same scale as Fig. 6;

Fig. 8 is a further cross section through a portion of the side wall and the adjacent part of the mud guard along line 8—8 of Fig. 4.

Figure 2:
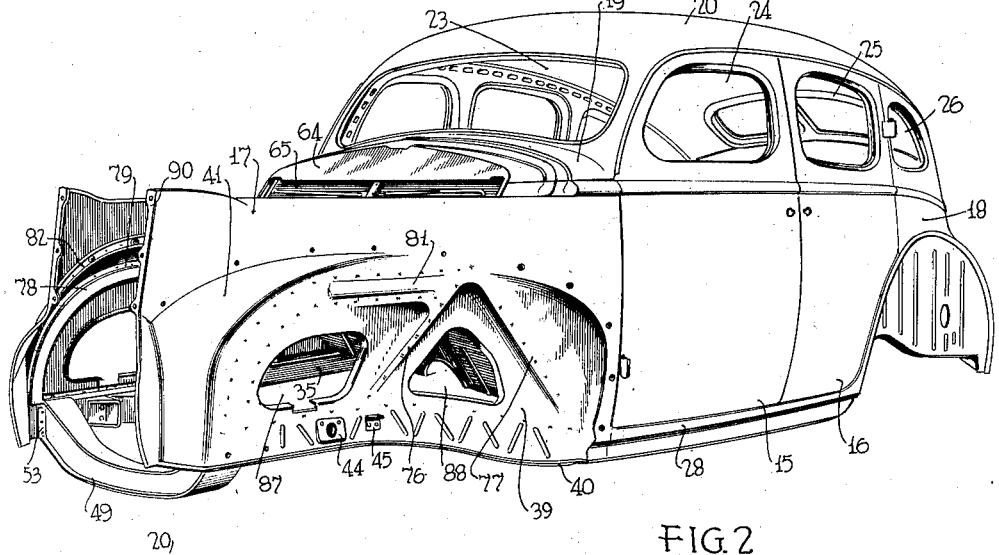
Fig. 2 is a perspective three-quarter front view of the same body at a somewhat larger scale.

The body which is shown in the drawings, is provided on either side with a front door 15, a rear door 16, a forward side panel portion 17 and a rear side panel portion 18. Between the side panels and the doors, the panel 19 which forms the top of the cowl, the roof panel 20 and the door 21 for a luggage compartment are arranged.

Figure 3:
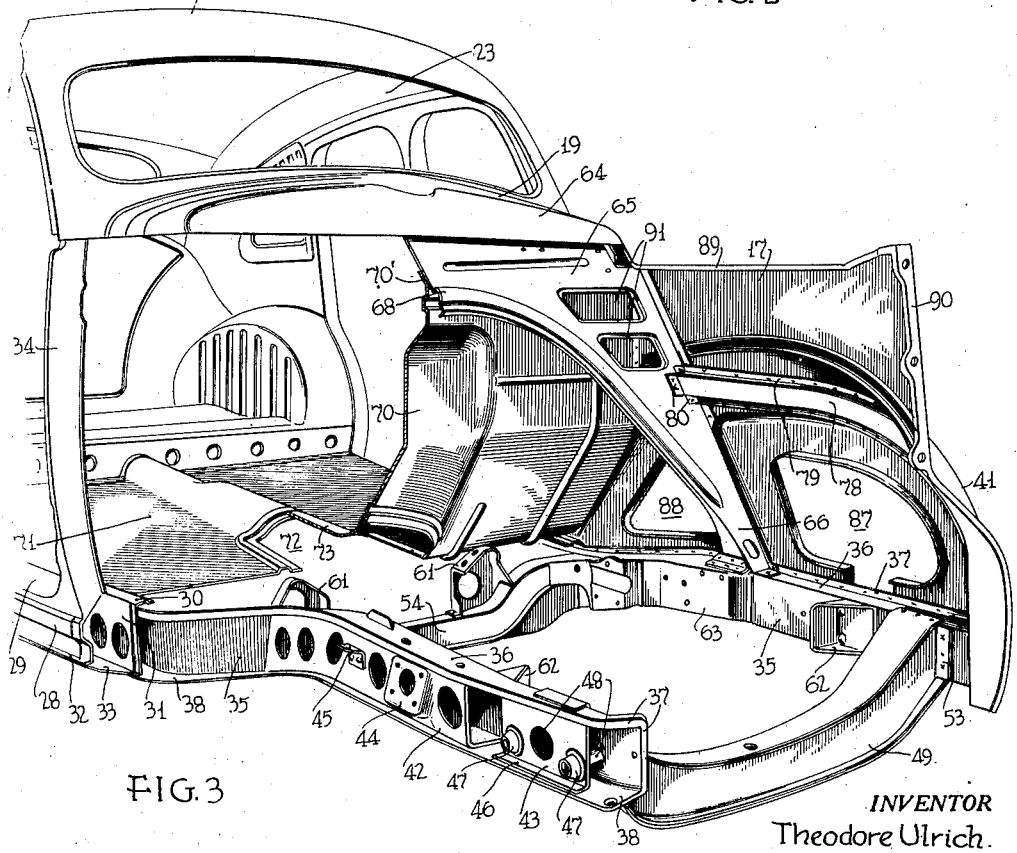
Fig. 3 is another three-quarter front view of the body, yet seen from the opposite side as Fig. 2, certain parts being broken away, and on a still larger scale.

The body is furthermore provided with the usual windshield opening 23, the door window openings 24, 25 and the rear quarter side windows 26.. The side panel portions 17 and 18 are interconnected on either side below the doors by side panel portions 28 which latter form the thresholds. The lower longitudinal side margins of the body panels are reinforced in a manner now to be described. The threshold portions of the side panels are in general of inwardly and downwardly facing angle section. The upper arm 29 of this angle section rail is fastened to the upper arm 30 of an inner rail 31 which is Z-shaped in cross section. The web of this Z sectional rail is arranged vertically and spaced from the vertical portion of the panel 28. The lower margin of the panel 28 is provided with an outwardly directed flange 32 which is fastened, such as by spot welding, to the lower outwardly directed arm 33 of the rail 31. The panel portion 28 and the rail 31 extend forwardly to about the region of the front door post 34 which is visible in Figs. 3 and 4. This formation of the panel 28 and the rail 31 may extend rearwardly to the rear margin of the rear door and the reinforcement of the lower side margins of the body in the rear of the rear door opening may be accomplished in a similar manner as shown and as described in the following for the front end of the car. This reinforcement of the rear end is not shown and described because it does not form a feature of the invention.

An outwardly facing channel member 35 is provided along each lower side margin of the body. This member has an upper wall 36 which ends in an upwardly directed flange 37, and a lower substantially horizontal wall 38. This member 35 extends for a certain distance rearwardly beyond the front door posts 34 where it is fastened by its flange 37 to the web of the rail 31 and by its lower wall 38 to the lower wall 33 of the same rail, the height of the member diminishing from about the front posts 34 toward its rear end. In the region from about the front door posts 34 to the rear end of the member 35, the members 28, 31 and 35 form together a double box sectional sill structure of great strength. In front of the posts 34, the rail 35 is fastened by its flange 37 to the lower portion 39 of the side wall panel 17 which forms simultaneously the inner wall of the front wheel housing, whereas the lower wall 38 of the rail is fastened to a marginal flange 40 which is bent off from the same wheel housing wall 39. Between its upper portion 39' and its wheel housing portion 39, the panel 17 is provided in its forward region with a more or less transversely extending and forwardly and downwardly curved portion 41. The lower end of this portion 41 closes the front end of the rail 35, the flange 41 of which is extended for this purpose across the front edge of the wall 38 and along the front edge of the vertical wall of the rail 35 as visible from Figs. 3 and 4.

In regions which are especially stressed, the box sectional sills formed by the rail 35 and the wall portion 39 are interiorly reinforced by brackets 42 and 43. The bracket 42 is in the form of an inwardly opening channel the walls of which are fastened as by spot welding to the walls 36 and 38 respectively of the rail 35. Certain portions of this bracket such as the projection 44 and a supplemental bracket 45 extend in the assembled state of the body through openings in the wall 39 so as to allow the direct fastening thereto of certain members of the automobile such as shock absorbers, wheel suspension elements or the like. The bracket 43 is connected to the walls 36 and 38 of the rail 35 by outwardly directed flanges 46 and it carries cup shaped members 47 which serve for the reception of spacer bushings 48 through which attachment bolts (not shown) for the wheel suspension may pass.

A box sectional cross member 49 connects the forward ends of the rails 35. This cross member consists of a downwardly opening channel member 50 which is provided with lateral flanges 51 and of a plate 52 which is fastened as by spot welding to said flanges 51. The upper and the lower wall of this cross member overlap and are connected to the upper and lower walls 36 and 38 respectively of the rail 35 and the side walls of the cross member 49 are provided with lateral flanges 53 at their ends which are fastened to the vertical walls of the rails 35. This cross member may serve for the support of the front end of the motor unit (not shown) and for the attachment of certain parts of the front wheel suspension which are likewise not shown.

A second box sectional member 54 interconnects the rails 35 near their rear end. This cross member consists similar to the cross member 49 of a downwardly opening channel member 55 the side walls of which are provided along their longitudinally extending edges with lateral flanges 56 and the open side of which is closed by a plate 57 which is fastened to the flanges 56. This member 54 differs from the member 49 however therein that the bottom plate 57 is comparatively flat in the central region only of the plate whereas it has the form of an upwardly opening channel in the end regions as visible from Figs. 3 and 5. These channel shaped sections of the plate 57 are provided with laterally extending flanges 58 which serve for the attachment to the flanges 56 of the upper member 55. By this formation the height of the cross member 54 is increased at its ends. Near the one end of the member 54 a longitudinally extending opening 59 is formed which may serve for the accommodation of the exhaust pipe (not shown). This opening 59 is attained by depressions in the side walls and in the flanges 56 and 58 respectively of the upper and lower members 55 and 57. The ends of the cross member 54 are fastened similarly to the member 49 by flanges 60 and by extensions of the upper and lower wall which overlap the corresponding walls of the rails 35. The cross member 54 serves as support for the rear end of the motor unit and carries for this purpose brackets 61. Further brackets, such as 62 and 63 may be fastened to the rails 35 and the cross member 54 respectively for additionally supporting the motor unit or certain parts thereof, or the steering gear, or parts of the front wheel suspension.

The panel which forms the upper wall 19 of the cowl is provided with a forwardly and downwardly extending portion 64 which forms the upper section of the shroud structure. This shroud section 64 is downwardly and forwardly inclined and continued by a wall member 65 the upper margin of which is fastened to the lower margin of the section 64 in a manner as indicated in Fig. 4. The wall 65 may consist of two halves which overlap and are connected to each other near the central longitudinal vertical plane of the body as likewise indicated in Fig. 4. The wall 65 is in the form of a downwardly opening horse shoe. The lower ends 66 of this horse shoe are fastened by flanges and brackets to the side rails 35. The margin of this wall 65 which surrounds the opening of the horse shoe is reinforced by a downwardly and rearwardly directed flange 67, a beading 68 and a laterally flanged channel member 69 which is welded to the rear side of the wall 65 so as to form a box sectional rail together with the beading 68. A shroud panel 70 proper is fastened as by electric spot welding along its upper bent off margin 70' to the underside of the wall 65. This shroud panel 70 merges into the horizontal floor panel 71. An opening 72 in the panel 70 and 71 gives access to the gear box (not shown) which will be located in the completely assembled car therebeneath. This opening is closed by a removable cover 73.

Flanges 74 along the side edges of the wall 65 and flanges 75 along the side edges of the dash panel 70 serve as a rigid connection of these panels to the side wall panels 17 and the wheel housing section 39 thereof. So as to reinforce the strength and rigidity of the panel 17 in the wheel housing region 39 and so as to facilitate the formation and the attachment of the wall 65 and the panel 70, the wheel housing portions 39 are provided with outwardly extending elongated projections 76 and 77 which form substantially plane and straight attachment surfaces for the correspondingly straight side edges and flanges 74 and 75 of the members 65 and 70 respectively.

Outwardly facing curved channel members 78 are fastened by laterally extending side flanges 79 to the inner surface of the side wall panel 17 and by tongues 80 which are bent off from their ends to the wall 65 and the forward ends of the rail 35 respectively. The wheel housing portion 39 of the panel 17 is provided with a third outwardly extending projection 81 for the purpose of reinforcement and of forming, at least along its longitudinal margins a plane and straight attachment surface for the rail 78. To increase the transverse area of the box sectional sill which is formed by the rail 78 and the wall portion 39, the middle portion of the projection 81 may form a beading as clearly visible in Figs. 2 and 6.

An inwardly opening U sectional rail 82 is fastened to the inner surface of the panel 17 on either side of the body. This rail carries a number of nuts 83 or other threaded portions which serve for the fastening of the mud guard 84 by means of bolts 85. Reinforcing members 86 are arranged between the upper end of the wall 65 and the front door posts 34 so as to transmit the stresses from said wall into said door posts. The wheel housing portions 39 are provided in the front and in the rear of the wall 65 with comparatively large openings 87 and 88 through which access can be had to the motor and which can be closed by removable (not shown) cover members. In the rear of the wall 65 the nuts or the like 83 for fastening the mud guard 84 by means of bolt 85 are fastened separately to the panel 17. The upper margin of the side panel 17 is flanged inwardly and downwardly at 89 so as to reinforce this edge and to form a ledge for supporting the removable (not shown) motor hood. The front edges of the panel 17 are similarly provided with inwardly and rearwardly directed flanges 90 which serve for the attachment of a (not shown) transverse panel which may comprise the radiator grille. The wall 65 is provided with some comparatively large openings 91 which serve for weight reduction and for giving access to certain parts of the equipment which may be arranged between this wall and the dash panel 70.

The different parts of the vehicle body which is shown in the drawings are intended to be stamped from sheet steel as it is now the general practice in the industry. The invention is however, not restricted to this kind of material but its features may also be applicable to other types of material or to bodies which are composed partly of sheet metal stampings and partly of members made from other material. It will be found moreover that the invention is liable to many modifications which are all intended to be covered by the language used in the following claims.

What I claim is:

1. In a vehicle body, a wheel housing wall curved in cross section, a plurality of portions raised outwardly above the curvature of said wall and providing substantially flat surfaces, said raised portions meeting in one region from which they extend in different directions in a star like manner, a dash board having its side margin fastened to one of said raised portions, a reinforcing transverse member extending from the upper portion of said dash board downwardly and toward the end of the body and fastened by its side margin to a second raised portion, and a reinforcing rail extending in the general direction of the wheel housing wall and fastened to a third of said raised portions.

2. In a vehicle body, a wheel housing wall curved in cross-section, a plurality of portions raised above the curvature of said wall and providing substantially plane surfaces, said raised portions extending in different directions across said curvature, the side margins of a corresponding number of reinforcing structures having their correspondingly shaped margins fastened to said raised portions.

THEODORE ULRICH.